United States Patent
Gold

[15] 3,690,240
[45] Sept. 12, 1972

[54] REFLECTIVE IMAGING APPARATUS

[72] Inventor: Nathan Gold, Framingham, Mass.

[73] Assignee: Polaroid Corporation, Cambridge, Mass.

[22] Filed: Oct. 22, 1970

[21] Appl. No.: 83,030

[52] U.S. Cl. ........................................95/42, 350/292
[51] Int. Cl. ..............................................G03b 19/12
[58] Field of Search..................95/42, 11 V; 350/292

[56] References Cited

UNITED STATES PATENTS

| 3,280,714 | 10/1966 | Gunther et al.................95/42 |
| 3,464,338 | 9/1969 | Jurenz............................95/42 |
| 2,859,745 | 11/1958 | Von Brudersdorff..350/292 X |
| 2,945,417 | 7/1960 | Caryl et al. ............350/292 X |
| 3,003,387 | 10/1961 | Schiele............................88/1 |

Primary Examiner—Samuel S. Matthews
Assistant Examiner—Richard A. Wintercorn
Attorney—Brown & Mikulka, William D. Roberson and Michael Bard

[57] ABSTRACT

The subject invention provides a reflex camera having a novel means of image reflection for use in viewing an image, transmitted through an entrance pupil to said image reflection means, at an exit pupil remote from both said means and said entrance pupil.

47 Claims, 4 Drawing Figures

REFLECTIVE IMAGING APPARATUS

Basically, the camera of the subject invention includes an essentially flat plate having a reflective surface. The reflective surface is so formed as to provide a plurality of minute facets extending thereover. Each of said facets is so oriented as to be normal to the bisector of the angle subtended by two lines, each drawn from one of a pair of spaced points, corresponding to entrance and exit pupil points, and meeting at said facet.

When each of said plurality of facets is oriented as aforesaid, and when they are sufficiently small in size, any light passing through said entrance pupil point and impinging on any of said facets will be reflected from such facet to said exit pupil point. Such reflection will be independent of the direction of the light from said entrance pupil point and it should be noted that the subject invention will be free of aberrations such as astigmatism and coma.

BACKGROUND OF THE INVENTION

The subject invention relates generally to photographic cameras of the reflex variety and, more particularly, to such a camera wherein an image formed therewithin, by light from an entrance pupil, may be viewed at a predetermined remote exit.

It is well known that various types of optical apparatus have been employed in prior art systems for precisely imaging light emanating from a point source, or appearing to so emanate, to a predetermined remote point. Such devices have found application in various photographic applications and have additionally found application in spectroscopic and spectrometric devices.

It is well known that light appearing to emanate from a point source may be reflected to a predetermined remote point by means of an ellipsoid-shape mirror. In order to accomplish such imaging, it is necessary that the point source be coincident with one of the foci of the ellipsoid and that the predetermined remote point, to which it is desired to reflect light, be coincident with the other foci of the ellipsoid.

As a practical expedient, if has been found that a concave spherical-shape mirror may be utilized to reflect light from a point source to a remote predetermined point. In order to effect such reflection, it is necessary that the point source be positioned off the optical axis of the spherical-shape mirror. The ease of obtaining and/or fabricating such a spherical-shape mirror and, hence, the desirability of its use for the purposes aforesaid should be readily apparent. approximation Not infrequently, however, it is necessary that the optical means utilized for imaging a real or apparent point source to another point be essentially flat or planar. Where such is the case, it has been found expedient to resort to a mirror utilizing the principles of a Fresnel lens. Such a mirror may be envisioned by considering a concave spherical-shape mirror divided into a plurality of frusta, each formed by the intersection of a pair of spaced parallel planes with said mirror normal to the optical axis thereof. If each of said plural frusta are concentrically arranged on a flat surface, a reflective device will be created approximating the same optical qualities as said spherical-shape mirror, but one which is essentially planar. Hereinafter, such a planar approximation of a concave spherical-shape mirror will be referred to as a Fresnel-type mirror.

It should be readily apparent that the Fresnel-type mirror is preferred to its concave spherical-shape counterpart for many applications, if for no other reason, than because of its compactness of size and ease of fabrication.

Unfortunately, the use of a concave spherical-shape mirror, or its Fresnel-type counterpart, entails several disadvantages. As is well known in the art, the use of such structures invariably results in attendant image distortion, due to the inherent aberrations in the mirror structures, such as astigmatism and coma.

Coma, of course, is an aberration affecting only points off the optical axis and it is known that coma is directly proportional to the distance of such points from said optical axis. It is known, too, that astigmatism varies with the square of the image height and, hence, we find that the very use to which it is desired to put the concave spherical-shape mirror, or its Fresnel-type counterpart (i.e., reflection in an off-axis mode), is one wherein significant coma and astigmatism will be introduced.

SUMMARY OF THE INVENTION

The present invention contemplates a novel reflex camera incorporating image reflection means for reflecting the image of an entrance pupil or point source to a remote predetermined point or exit pupil. The instant invention accomplishes this function without introducing significant aberration, such as coma or astigmatism to the image.

Briefly, the instant invention envisions a relatively planar reflecting surface comprising a plurality of discrete facets each so oriented that light emanating from a real or apparent point source will be reflected therefrom and imaged at a remote predetermined point. Additionally, the instant invention provides a means for insuring that substantially all of the light entering the entrance pupil of an optical system will be transmitted to a predetermined remote exit pupil.

Consider a planar surface covered with contiguous discrete facets each of which comprises a minute essentially planar surface approximating a single point on the larger surface. Consider further, a pair of conjugate points disposed outwardly of the larger planar surface with one of said conjugate points serving as a real or apparent source of light or other electromagnetic energy. In order to reflect light emanating from said source to its conjugate point, each facet or point on the larger surface must be so oriented as to be essentialy normal to a line bisecting the angle subtended by lines drawn to each such facet from said conjugate points. Where each said facet is so oriented, it is clear that any light, for example, impinging on the larger surface from said point source will be reflected to its conjugate point. Each such facet may be thought of as lying in a plane tangent to an ellipsoid, having said conjugate points as foci, at a point of intersection between such ellipsoid and said larger surface. Clearly, where said facets are sufficiently large in number and small in size, they will provide an essentially planar approximation of an ellipsoidal reflecting surface. Such a surface will also function to image an entrance pupil positioned with one of its foci at the center of said pupil such that the other of its foci will lie at the center of such image.

Accordingly, it is an object of the present invention to provide a camera including means for reflecting light from a fixed point source to a predetermined point.

Another object of the instant invention is to provide a means, adapted for use with a photographic camera, for imaging electromagnetic energy from a point source to its conjugate by means of a relatively planar reflector.

Still another object of this invention resides in the provision of relatively aberration free means for imaging light or other electromagnetic radiation emanating from a real or apparent light source to a predetermined point.

Yet another object of this invention resides in the provision of a simple, inexpensive, and relatively flat means for reflecting electromagnetic radiation emanating from a real or apparent source to a predetermined point without introducing unwanted astigmatism or coma.

It is a further object of the present invention to provide an optical device for imaging a point source to a predetermined remote point and that is compact, inexpensive, relatively free of unwanted aberration and adapted for use in photographic and spectroscopic apparatus.

A still further object of this invention is to provide a viewing system for a photographic camera having a relatively aberration free and essentially planar means for imaging the entrance pupil of such viewing system to a predetermined remote location.

Yet an even further object of this invention is to provide a relatively planar reflecting surface for use in the viewing system of a reflex camera to enable the off-axis viewing of an image.

DESCRIPTION OF THE DRAWINGS

Other objects and many of the attendant advantages of the present invention will be better appreciated and said invention will become clearly understood by reference to the following detailed description when considered in conjunction with the accompanying drawings illustrating one embodiment of the instant invention, wherein.

DETAILED DESCRIPTION OF THE INVENTION

Figure 1:
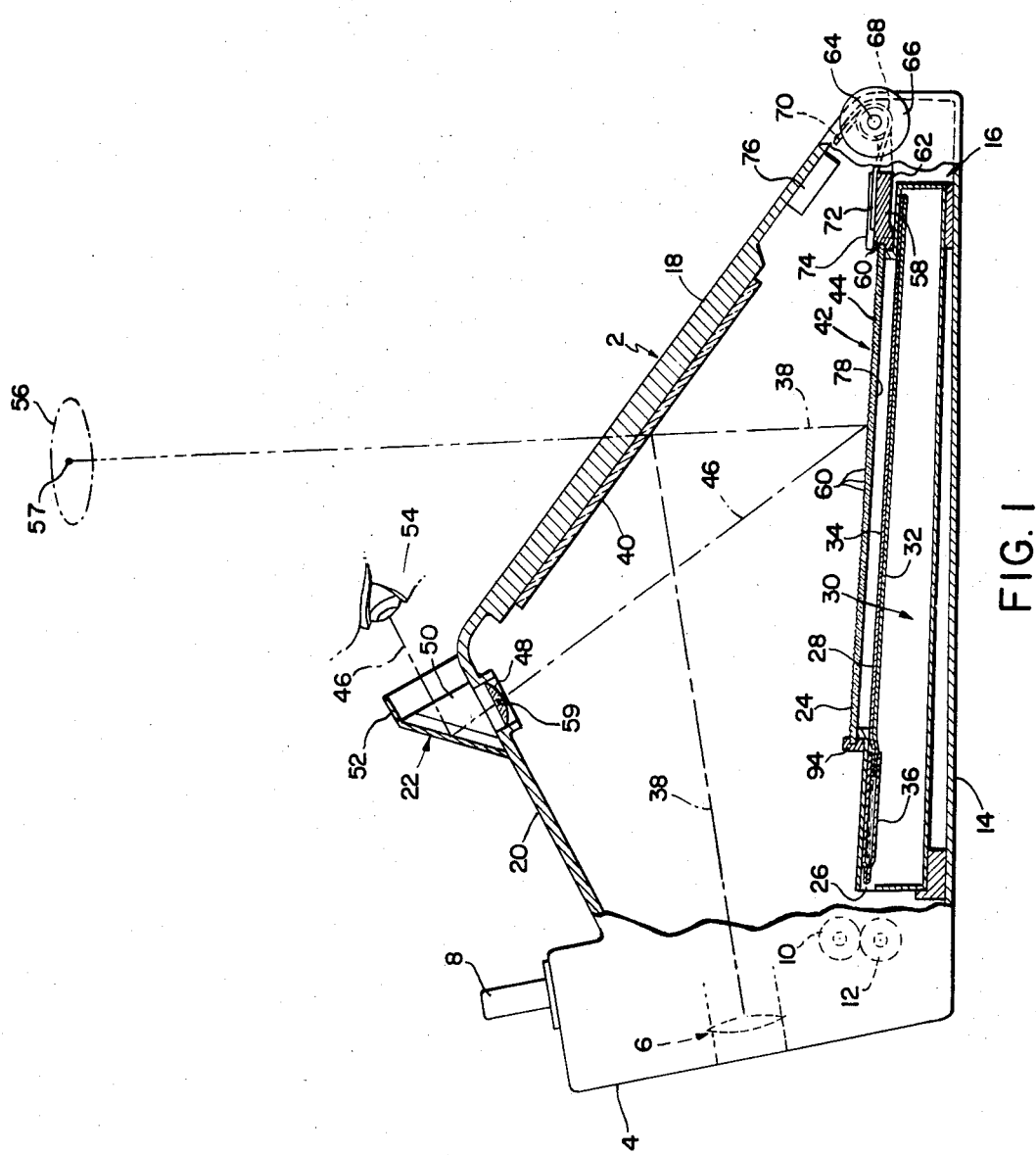
FIG. 1 provides a fragmentary cross-section of a reflex camera embodying the instant invention.

Referring now to the drawings in more detail, and, more particularly to FIG. 1, a photographic camera of the type more fully described in copending application, Ser. No. 28,567, filed Apr. 15, 1970, is illustrated generally at 2. The camera 2 is formed having a forwardly disposed exposure control system housing within which are mounted all of the components required to regulate light passing into the camera. These components include, but are not limited to, an objective lens system shown generally at 6, a shutter release button 8, electronic control circuitry and the film unit processing rolls 10 and 12. The camera 2 is of a reflex variety having a bottom support portion 14 which serves as a receiving and retaining chamber for a film-laden cassette structure as at 16. The uppermost surfaces of the camera 2 include a relatively elongated top wall section 18 which will be seen to support reflecting surfaces of a reflex optical system. The elongated top wall section 18 is joined with a shorter forward wall portion 20 which serves to support a viewing arrangement illustrated generally at 22.

The film retaining cassette 16, positioned within the bottom support housing 14 of the camera 2, is formed as a generally thin parallelepiped having a top open portion, the rectangular periphery of which is defined by an integrally formed ridge 24. The forwardmost facing side of the cassette 16 is formed incorporating an opening of slot 26 aligned with the line of tangency between the rolls 10 and 12. The cassette 16 is removably insertable within a cassette receiving chamber within the bottom support portion 14 so as to consistently and accurately orient an exposure plane 28 established at the lowermost periphery of the film frame opening defined by the ridge 24. A detailed disclosure of the mechanisms for supporting the cassettes as at 16 within the camera 2 may be found in copending U. S. Pat. application, Ser. No. 655,850, filed July 25, 1967, by E. H. Land and A. H. Bellows, and commonly assigned herewith.

Coincidently situated at the exposure plane 28 is an uppermost one of a plurality of the film units 30. Described in detail in U. S. Pat. No. 3,415,646, issued Dec. 10, 1968, to E. H. Land, and entitled "Novel Photographic Products and Processes," film units as at 30 include all of the materials necessary to produce a positive photographic print. Each of the units 30 is physically structured to include a photosensitive element 32 positioned adjacent and in laminar relationship with an image-receiving element 34. The image-receiving element 34 is located upwardly from the element 32 and is urged by spring means (not shown) into the exposure plane 28. A frangible container 36 of processing fluid is secured to one end of the laminar assembly of the elements 32 and 34 and is located forwardly within the cassette structure 16. The frangible containers 36 dispense their processing fluid between the elements 32 and 34 when subjected to appropriate compressive pressure. Each of the film units as at 30 is adapted to be processed when advanced, frangible container 36 foremost, through the slot 26 and between the pressure-applying processing rolls 10 and 12. The latter manipulation causes the frangible containers 36 to dispense their fluid contents between the elements 32 and 34 and to spread the fluid between and in contact with these two elements. The image-forming process is now well known in the art and involves the formation of transverse image-forming substances in the exposed photosensitive element accompanied by their diffusion in a manner forming a visible, positive image. In the film unit 30 shown herein and described in the aforementioned United States patent, the processing fluid includes an opacifying agent which is spread as a layer between the photosensitive element 32 and the transparent element 34. The opacifying agent is opaque to actinic radiation and provides a background for the photosensitive transfer image evolved in the process.

The components of the camera 2 normally assume a configuration for operation in a focusing mode. During a photographic cycle, however, these components are reoriented to assume an exposure mode configuration, (not shown). As illustrated in FIG. 1, the components of the camera 2 are shown as they assume a focusing mode configuration. In this configuration, the lens system as shown only generally at 6 may be considered to define a mean optical path which, for illustrative purposes, is designated by the path line 38. The optical path as designated at 38, passes from the lens system 6 and across the exposure chamber of the camera 2 until it impinges upon and is reflected from a specular surface shown as a mirror 40. The mirror 40 is stationary and is fixed to the elongated top wall section 18 of the camera 2.

Upon reflection from the mirror 40, the optical path courses to a viewing surface which comprises the generally planar reflecting surface 42 of the plate 44. Light rays re-directed from the viewing surface 42 are illustrated by a path line 46 and are reflected to the viewing arrangement 22. The viewing arrangement 22 includes a lens 48 and an Amici element roof prism 50 mounted within an eyepiece housing 52. The housing 52 is attached to the forward wall section 20 at a position suitable for viewing from a station as at 54. The presence of this roof prism 50 provides a right-left reversal correction for facilitating operator viewing from the eye station 54.

The lens system 6 functions to define an entrance pupil 56 which, due to the mirror 40 and the length of the optical path 38, appears to be positioned with its pupil point at the point 57 with respect to the surface 42.

The reflecting surface 42 comprises a plurality of discrete facets 60 (to be more fully described infra) such orientation that with the entrance pupil 56 positioned with the point 57 at its pupil point, light passing through said entrance pupil 56 and incident on said surface 42 will be reflected therefrom through first exit pupil (not shown) positioned with an image 59 (to be discussed infra) at its pupil point.

The first exit pupil may be thought of as the image of the entrance pupil 56. Also, because light reflected from the surface 42 is concentrated at the first exit pupil, it should be clear that a bright view of the image focused onto the surface 42 may be seen by placing the eye at said first exit pupil, or such image may be seen at a remote location such as the viewing station 54, by means of the viewing system 22 which may be thought of as defining a second exit pupil. Furthermore, light will be reflected from the surface 42 of the plate 44 to the first and second exit pupils without introducing comatic or astigmatic aberration into the image of the entrance pupil 56.

With the arrangement above described, the camera 2 may be focused by adjusting the lens system 6 whilst simultaneously viewing the image projected to the viewing surface 42 from the viewing arrangement 22. With this focusing mode of operation, the optical path 38 may be considered to have a predetermined length and the lens system 6 may be considered to establish a focal plane which, when the camera is focused, lies in coincidence with the viewing surface 42.

The viewing surface 42 is disposed along the plate 44 which, in turn, is mounted upon or formed as an integral component of an operator unit shown generally at 58. Formed of a material opaque to light, the operator unit 58 is of generally flat configuration and includes a peripheral rib portion or frame 60. The frame 60 is rectangular in shape and is dimensioned to nest over the ridge 24 of the film cassette 16. As a consequence of this configuration, the operator unit 58 serves to light-seal, or cap the exposure plane 28 at which a film unit 30 is positioned. The peripheral frame 60 of the operator unit 58 is formed integrally with the hinge portions 62 which are fixed to an axle 64. The axle 98 is journaled for rotation within the housing of the camera 2. Extending through one side of the camera housing, the axle 64 is fixed to a hand manipulated knob 66.

The viewing surface 42 of the operator unit 58 is biased into the focusing mode orientation shown in FIG. 1 by a centrally disposed helical spring 68. The spring 68 has a stationary leg 70 positioned in abutment against the top side 18 of the camera housing and a movable leg 72 tensioned against camera housing and a movable leg 72 tensioned against a portion of the operator unit 58 assembly. A magnetizable metal insert 74 is fixed to a portion of the operator unit 58. The insert 74 forms part of a magnetic latching assembly including a permanent magnet 76 fixed to the inward side of the top wall section 18.

To convert the camera 2 to the exposure mode configuration, the knob 66 of the operator unit 58 is rotated against the bias of the spring 68 until the metallic insert 74 contacts and is attached to the magnet 76. When so magnetically latched, the mirror 40 is isolated from the earlier derived optical path 38; the viewing surface is removed from the exposure plane 28; and a second reflecting surface 78, formed on the underside of the plate 44, is introduced in operative position within the exposure chamber. A more complete understanding of the operation of the camera 2 in the focusing and exposure modes may be had by reference to copending application, Ser. No. 28, 567, aforesaid.

Figure 2:
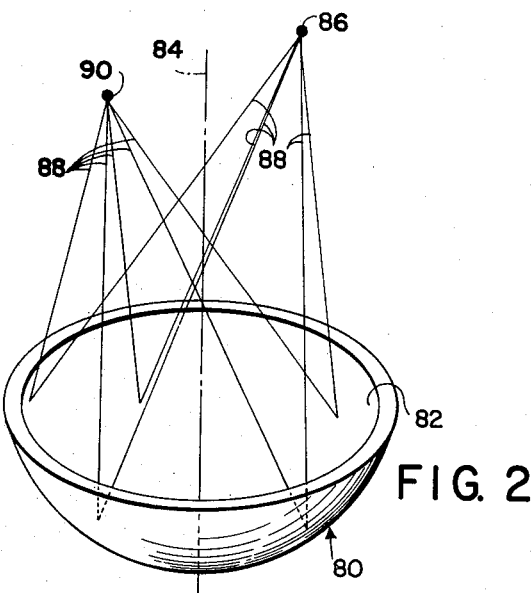
FIG. 2 is a simplified perspective of a prior art point-to-point imaging device.

Referring to FIG. 2 in more detail, a concave spherical-shape mirror is shown generally at 80 having a reflecting surface 82 that is concave opening upward and is symmetrically disposed about an axis 84 which serves as the optical axis for the mirror 80. A point source of light is shown at 86 disposed outward of both the reflecting surface 82 and the optical axis 84. In practice, the point source 86 may be a real or apparent source; i.e., it may, for example, correspond to an extended light source imaged at the focal point of a lens.

A plurality of light rays 88 are shown emanating from the point source 86 and impinging on the reflecting surface 82. By virtue of the shape of the reflecting surface 4 and the positioning of the point source 86 with respect to said surface 82 and the optical axis 84, the light rays 88 impinging on said surface 82 will be reflected therefrom and imaged in the general vicinity of a point 90. The position of the image point 90 will be predetermined by that of the point source 86 with respect to said reflecting surface 82 and said optical axis 84 and the optical properties of said surface 82.

The term "general vicinity" of the point 90 has been used because effective and precise point-to-point reflective imaging was heretofore possible only through the use of expensive and difficult to obtain ellipsoidal reflecting surfaces. Also, in addition to its failure to provide accurate point-to-point reflective imaging, the mirror 80, by virtue of its geometry, introduces comatic and astigmatic aberration into the image of the point source 86 reflected to the image point 90. Such aberration depends from the perpendicular distance from the point source 86 to the optical axis 84.

In addition to the foregoing, prior art devices whether of the ellipsoidal or concave spherical variety, suffer from a common defect in that they inherently take up an unnecessary amount of space. In an effort to overcome this space problem, the prior art mirror 80 of FIG. 2 evolved into the configuration illustrated in FIG. 3.

Figure 3:
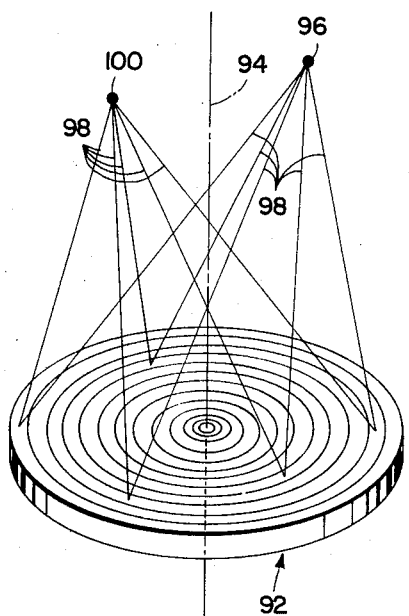
FIG. 3 provides perspective of an improved prior art point-to-point imaging device.

Referring to FIG. 3 in more detail, a Fresnel-type mirror is shown generally at 92 symmetrically disposed about an optical axis 94. The Fresnel-type mirror 92 represents an attempt to reduce the mirror 80 of FIG. 2 to an essentially planar structure and fairly accurately approximates the imaging characteristics of said mirror 80. Thus, if we consider a real or apparent point source of illumination 96 positioned outward of the mirror 92 and the optical axis 94, light rays 98 emanating from said point source 96 will impinge on the reflective surfaces of the mirror 92 and be imaged in the vicinity of a point 100. As in the case of the spherical-shape concave mirror 80 of FIG. 2, comatic and astigmatic aberration will be introduced into the image appearing at 100 in an amount dependent on the distance from the point source 96 to the optical axis 94 of the device of FIG. 3.

Clearly, then, the prior art was able to produce accurate point-to-point reflective imaging devices (such as an ellipsoidal mirror) and to produce compact point-to-point imaging devices (such as the Fresnel-type concave spherical mirror). What the prior art failed to provide was a point-to-point reflective imaging device that was simultaneously compact, accurate, and relatively aberration free.

Figure 4:
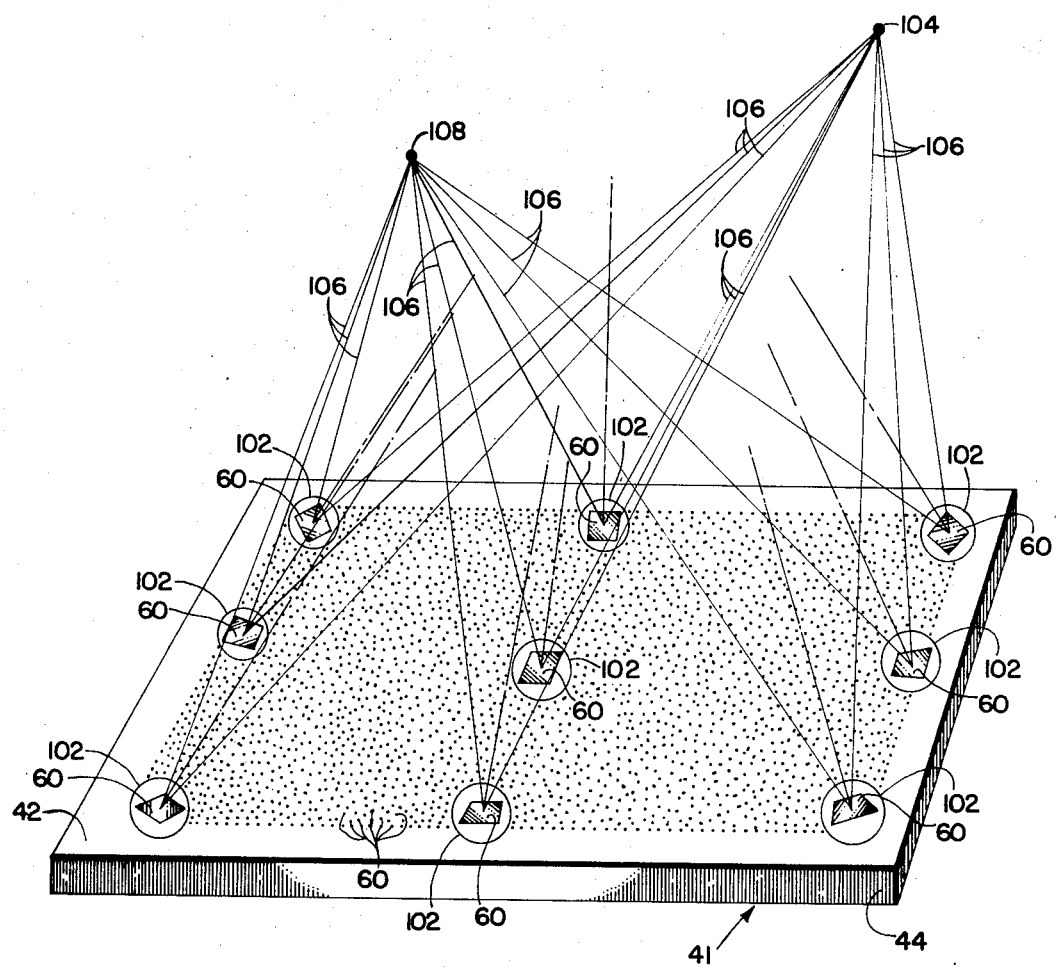
FIG. 4 provides a perspective of the subject invention.

Referring again to FIG. 4, the novel viewing surface of the subject invention is illustrated in more detail at 44 and is seen to comprise the essentially flat plate 44 having a generally planar upper surface 44 (of FIG.1). The surface 42 of said plate 44 is covered with minute indentations 60 each of which, as best seen in enlarged detail perspectives 102, comprises a facet having a predetermined angular orientation with respect to the plane of said surface 42. The facets are essentially planar, but it may be efficacious to provide them with a small radius. Accordingly, the term "essentially planar" when used with reference to such facets is meant to include facets having a small radius of curvature but which are small enough to appear to be planar.

A point source of illumination is shown at 104 and may comprise a real or apparent point source of illumination. Typically, the point source 104 may represent an apparent point source such as the pupil point 57 of FIG. 1. Plural light rays 106 emanating from the point source 104 are illustrated, each impinging on a discrete facet 60 from whence they are reflected and converge at an image point 108 remote from said surface 42 and said point source 104. The image point 108 corresponds to the pupil point 59 of the first exit pupil of the device of FIG. 1.

The orientation of the facets 60 is determined by the relative positions of the point source 104 and image point 108 with respect to the surface 42 of said flat plate 44. In order for light emanating from said point source 104 to be reflected to said image point 108, each of said facets 60 must be so oriented as to be normal to a line lying in the plane containing the impinging and reflected ray 106, for the particular facet 60, and bisecting the angle formed by said impinging and reflected ray 106. When each said facet 60 is so oriented with respect to a particular light ray 106, that light ray 106 will be reflected to said point 108.

Clearly, any particular facet 60 will be exactly oriented to reflect only one particular light ray 106 to said image point 108 and any other light ray 106 impinging on that particular facet 60 will not be reflected exactly to said image point 108. Thus, the smaller the surface area of each of the facets 60 and the greater the number of such facets 60, the greater will be the ability of the plate 44 to accurately image the point source 104 to the point 108. When the facets 60 are sufficiently small in size and great in number, the surface 42 will provide an essentially planar approximation of an ellipsoidal reflecting surface.

In addition to providing a relatively planar reflecting surface 42 (with its inherent minimal space requirements) the novel viewing surface 41 of the subject invention does not introduce astigmatism or coma into the reflected image as is attendant in the use of the prior art devices illustrated in FIGS. 2 and 3 and described supra.

The plate 44, itself, may comprise metal, plastic, or other suitable material and the surface 42 thereof may inherently be reflective or non-reflective to visible wavelengths of radiation. The forming of the facets 60 may be accomplished by hand or in accordance with the teachings of U. S. Pat. application, Ser. No. 83,029 filed on even date herewith by William T. Plummer and assigned to Polaroid Corporation. If the material of the plate 44 is non-reflective, then it may be necessary to apply a reflective coating to the surface 42 after formation of the facets 60 therein.

In the light of the aforementioned teachings, it can readily be seen that many variations and modifications of the present invention are possible and it will be apparent to those skilled in the art that various changes in form and arrangement of components may be made to suit requirements without departing from the spirit and scope of the invention. It is, therefore, to be understood that within the scope of the appended claims, the instant invention may be practiced in a manner otherwise than is specifically described herein.

What is claimed is:

1. A photographic camera including:
    means defining an exposure plane;
    means defining an entrance pupil;
    lens means for focusing the image of a subject through said entrance pupil at a focal plane;
    means establishing an optical path from said lens means to said focal plane, said optical path including specular means for establishing said focal plane at said exposure plane when in an exposure mode and for establishing said focal plane at a viewing surface near or at said exposure plane when in a focusing mode;
    means defining an exit pupil; and viewing means cooperable with said exit pupil defining means for inspecting the image formed on said viewing surface through said exit pupil, said viewing surface being essentially planar and comprising plural structurally dependent reflective surfaces so spatially oriented as to maximize the reflection of light from said entrance pupil through said exit pupil without introducing comatic or astigmatic aberration.

2. The invention as set forth in claim 1, wherein said entrance pupil has a pupil point located at a first predetermined point with respect to said viewing surface and said exit pupil has a pupil point in spaced predetermined relation to said entrance pupil point.

3. The invention as delineated in claim 2, wherein each said reflective surface is so oriented as to be normal to a line bisecting the angle formed by a pair of lines extending from said entrance pupil point and said exit pupil point, respectively, and intersecting at such reflective surface, whereby said viewing surface will effect an essentially planar approximation of an ellipsoidal reflecting surface.

4. In combination with a photographic camera comprising means defining an entrance pupil, means for imaging said entrance pupil at a predetermined remote location, including:
a support;
plural structurally dependent surfaces disposed along one surface of said support; and
means for reflecting light from said entrance pupil to a predetermined remote location so as to define an exit pupil without introducing comatic or astigmatic aberration.

5. The invention according to claim 4, wherein said plural surfaces comprise planar reflective surfaces each so oriented as to be essentially normal to a line bisecting the angle formed by a pair of lines extending from the geometrical centers of said entrance and exit pupils, respectively, and intersecting at such reflective surface.

6. In combination with a photographic camera having means defining an entrance pupil and an exit pupil, monolithic means including plural reflective surfaces for reflecting substantially all of the light passing through said entrance pupil to said exit pupil without introducing comatic or astigmatic aberration; wherein each of said plural reflective surfaces is essentially planar and said surfaces are sufficiently small in size and great in number as to provide an essentially planar reflecting surface.

7. The invention according to claim 6, additionally including means for imaging an object onto said essentially planar reflecting surface whereby light therefrom will be condensed at said exit pupil.

8. An imaging and viewing system, including:
means defining an entrance pupil;
lens means for forming an image of a subject through said entrance pupil at a focal surface;
a reflective screen located at said focal surface;
means defining an exit pupil; and
viewing means cooperable with said exit pupil defining means for inspecting the image formed on said screen through said exit pupil, said screen being essentially planar and comprising plural structurally dependent surfaces so spatially oriented as to maximize the reflection of light from said entrance pupil through said exit pupil without introducing comatic or astigmatic aberration.

9. The invention as delineated in claim 8, wherein said entrance pupil has a pupil point located at a first predetermined point with respect to said screen and said exit pupil has a pupil point in spaced predetermined relation to said entrance pupil point.

10. The invention as set forth in claim 9, wherein said plural surfaces each comprise a planar reflective surface.

11. The invention as stated in claim 10, wherein each reflective surface is so oriented as to be normal to a line bisecting the angle formed by a pair of lines extending from said entrance pupil point and said exit pupil point, respectively, and intersecting at such reflective surface.

12. Apparatus according to claim 11, wherein said plural reflective surfaces are so disposed as to provide an essentially planar approximation of an ellipsoidal reflecting surface having said entrance and exit pupil points as foci.

13. A viewing system for use with a camera having means defining an entrance pupil and an exit pupil with entrance and exit pupil points, respectively, in predetermined spaced relation; said viewing means including:
a screen; said screen comprising monolithic means including a plurality of specular surfaces of differing spatial orientation;
means for focusing the image of a subject onto said screen; and
means for reflectively focusing light reaching said screen from said entrance pupil to said exit pupil without introducing comatic or astigmatic aberration.

14. Apparatus as described in claim 13, wherein each of said specular surfaces comprises a facet so oriented as to be normal to a line bisecting the angle formed by line extending from said entrance and exit pupil points, respectively, and intersecting at such facet.

15. The invention as stated in claim 14, wherein said facets are sufficiently small in size and great in number whereby said screen will provide an essentially planar approximation of an ellipsoid having said entrance and exit pupil points as foci.

16. In combination with apparatus defining an entrance pupil, means for imaging said entrance pupil at a predetermined remote location, including:
a support;
plural structurally dependent surfaces disposed along one surface of said support; and means for reflecting light from said entrance pupil to a predetermined remote location so as to define an exit pupil without introducing comatic or astigmatic aberration.

17. The invention as related in claim 16, wherein said plural surfaces comprise planar reflective surfaces each so oriented as to be essentially normal to a line bisecting the angle formed by a pair of lines extending from the geometrical centers of said entrance and exit pupils, respectively, and intersecting at such reflective surface.

18. The invention as set forth in claim 17, wherein said plural reflective surfaces are formed within said support.

19. In combination with means defining an entrance pupil and an exit pupil, monolithic means including plural reflective surfaces for reflecting substantially all of the light passing through said entrance pupil to said exit pupil without introducing comatic or astigmatic aberration; wherein each of said plural reflective surfaces is essentially planar and said surfaces are sufficiently small in size and great in number as to provide an essentially planar reflecting surface.

20. The invention as delineated in claim 19, additionally including means for imaging an object onto said essentially planar reflecting surface whereby light therefrom will be condensed at said exit pupil.

21. In combination with means defining an entrance pupil and an exit pupil, means for transmitting illumination passing through said entrance pupil to said exit pupil including generally planar means approximating a specular ellipsoidal surface and comprising a plurality of structurally dependent planar reflective surfaces of differing spatial orientation.

22. Apparatus according to claim 21 wherein said reflective surfaces are formed in a single plate, or the like.

23. The invention in accordance with claim 22, wherein each of said planar surfaces is so oriented as to be normal to a line bisecting the angle formed by lines extending from a fixed pair of spaced points and intersecting at such planar surface.

24. In combination with means defining a fixed entrance pupil and a fixed remote exit pupil, apparatus for reflecting energy passing through said entrance pupil and condensing same at said exit pupil including:
   a base;
   plural specular facets generally disposed along one surface of said base in fixed predetermined spatial relation to one another and sufficiently small in size and great in number to provide an essentially planar approximation of an ellipsoidal reflecting surface having the geometric centers of said pupils as foci.

25. The invention as set out in claim 16, further including means for focusing the image of an object essentially in the plane of said one surface of said support, whereby light from such image will be condensed at said exit pupil so as to provide a viewable image of said object.

26. Apparatus for imaging a predetermined fixed point source of illumination at a predetermined fixed remote point, including:
   a support;
   plural structurally dependent surfaces disposed along one surface of said support in fixed spatial orientation; and
   means for reflecting light from said point source of illumination to said remote point whilst eliminating comatic and astigmatic aberration.

27. The invention as recited in claim 26, wherein said plural surfaces each comprise a planar reflective surface.

28. The invention as set forth in claim 26, wherein said plural reflective surfaces are each oriented in a different predetermined direction.

29. The invention as related in claim 28, wherein each of said reflective surfaces is so oriented as to be normal to a line bisecting the angle formed by a pair of lines extending from said point source and said predetermined remote point, respectively, and intersecting at such reflective surface.

30. The invention as delineated in claim 29, wherein said plural reflective surfaces are so disposed as to provide an essentially planar approximation of an ellipsoidal reflecting surface.

31. The invention as described in claim 30, wherein said plural reflective surfaces are formed within said support.

32. Monolithic means for reflecting light between a pair of conjugate points including plural reflective surfaces each oriented to reflect light from one of said conjugate points to the other of said conjugate points without introducing comatic or astigmatic aberration.

33. The invention as recited in claim 32, wherein each of said plural reflective surfaces is essentially planar.

34. The invention as delineated in claim 33, wherein each of said essentially planar surfaces is so small and their number so great as to provide an essentially planar reflecting surface.

35. The invention of claim 34, wherein said plural reflective surfaces are so disposed as to provide an essentially planar approximation of an ellipsoidal reflecting surface having said conjugate points as foci.

36. The invention as set forth in claim 35, wherein said plural reflective surfaces are each oriented in a different predetermined direction.

37. The invention of claim 36, wherein each of said plural reflective surfaces is so oriented as to be normal to a line bisecting the angle formed by extending lines from each of said pair of conjugate points to a point of intersection on that reflective surface.

38. Generally planar camera viewing screen means approximating a specular ellipsoidal surface and comprising a plurality of structurally dependent planar reflective surfaces of differing spatial orientation.

39. The invention according to claim 38, wherein said reflective surfaces are formed in a single plate, or the like.

40. Apparatus according to claim 39, wherein each of said planar surfaces is so oriented as to be normal to a line bisecting the angle formed by lines extending from a fixed pair of spaced remote points and intersecting at such planar surface.

41. Monolithic means for reflecting electromagnetic radiation between a pair of conjugate points including plural reflective surfaces each oriented to reflect energy from one of said conjugate points to the other of said conjugate points.

42. The invention as related in claim 41, wherein each of said plural reflective surfaces is essentially planar.

43. The invention as set forth in claim 42, wherein each of said essentially planar surfaces is so small and their number so great as to provide a generally planar reflecting surface.

44. The invention as delineated in claim 43, wherein said plural reflective surfaces are so disposed as to provide an essentially planar approximation of an ellipsoidal reflecting surface having said conjugate points as foci.

45. Apparatus for reflecting energy between a pair of points, including:
   a base;

plural specular facets generally disposed along one surface of said base in fixed predetermined spatial relation to one another and sufficiently small in size and great in number to provide an essentially planar approximation of an ellipsoidal reflecting surface having said pair of points as foci.

46. Generally planar viewing screen means approximating a specular ellipsoidal surface and comprising a plurality of structurally dependent reflective surfaces of differing spatial orientation and adapted to maximize light reflected between conjugate points comprising the foci of said ellipsoidal surface by minimizing comatic and astigmatic aberration.

47. In combination with a photographic camera comprising means defining an entrance pupil, means for imaging said entrance pupil at a predetermined remote location, including:
  a support;
  plural structurally dependent surfaces disposed along one surface of said support; and
  means for reflecting light from said entrance pupil to a predetermined remote location so as to define an exit pupil without introducing comatic or astigmatic aberration; said light reflecting means providing an essentially planar approximation of an ellipsoidal reflecting surface, the foci of which are coincident with the pupil points of said entrance pupil and the image thereof, respectively.

* * * * *

UNITED STATES PATENT OFFICE
CERTIFICATE OF CORRECTION

Patent No. 3,690,240          Dated September 12, 1972

Inventor(s) Nathan Gold

It is certified that error appears in the above-identified patent and that said Letters Patent are hereby corrected as shown below:

In the Claims:

Column 10, line 41, "line" should be --lines--.

In the Specification:

Column 1, line 42, "if" should be --it--; lines 50 and 51, after "apparent." delete "approximation";

Column 2, line 7, "Fresenel" should be --Fresnel--; line 52, "essentialy" should be --essentially--;

Column 3, line 61, after "housing" insert --4--;

Column 6, line 6, "60" should be --61--; line 7, "60" should be --61--; line 12, "60" should be --61--; line 14, "98" should be --64--; delete line 24;

Column 7, line 46, "44" should be --42--; line 53, delete "small"; line 55, delete "small".

In the Drawings:

Sheet 1, Fig. 1, the reference numeral "94" should be --61--; the reference numeral "60" identifying the rib portion of the operator unit 58 adjacent the insert 74 should be changed to --61--; the lead line from the numeral 24 should extend to the ridge of the film cassette 16;

Signed and sealed this 10th day of April 1973.

(SEAL)
Attest:

EDWARD M. FLETCHER, JR.
Attesting Officer

ROBERT GOTTSCHALK
Commissioner of Patents

FORM PO-1050 (10-69)